US009459521B2

(12) United States Patent
Bauer et al.

(10) Patent No.: US 9,459,521 B2
(45) Date of Patent: Oct. 4, 2016

(54) INFLATABLE PROJECTION SURFACE FOR A TRANSPORTATION MEANS

(71) Applicant: Airbus Operations GmbH, Hamburg (DE)

(72) Inventors: Hans-Achim Bauer, Hamburg (DE); Tilo Budinger, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 302 days.

(21) Appl. No.: 14/190,443

(22) Filed: Feb. 26, 2014

(65) Prior Publication Data

US 2014/0174558 A1 Jun. 26, 2014

Related U.S. Application Data

(63) Continuation of application No. PCT/EP2012/066990, filed on Aug. 31, 2012.

(60) Provisional application No. 61/530,063, filed on Sep. 1, 2011.

(30) Foreign Application Priority Data

Sep. 1, 2011 (DE) ........................ 10 2011 053 197

(51) Int. Cl.
*G03B 21/585* (2014.01)
*B64D 11/00* (2006.01)
(Continued)

(52) U.S. Cl.
CPC ......... *G03B 21/585* (2013.01); *B64D 11/0015* (2013.01); *B64D 11/00153* (2014.12); *G09F 15/0025* (2013.01); *B64D 13/00* (2013.01); *Y02T 50/46* (2013.01); *Y10T 137/3584* (2015.04)

(58) Field of Classification Search
CPC .... G03B 21/14; G03B 21/22; Y10T 428/13; G09F 15/0025
See application file for complete search history.

(56) References Cited

U.S. PATENT DOCUMENTS

| | | | |
|---|---|---|---|
| 3,457,006 | A | 7/1969 | Brown et al. |
| 4,313,208 | A | 1/1982 | Kavenik |
| 4,639,106 | A | 1/1987 | Gradin |

(Continued)

FOREIGN PATENT DOCUMENTS

| | | | |
|---|---|---|---|
| DE | 20304787 | U1 | 5/2003 |
| DE | 202005019292 | U1 | 2/2006 |
| WO | 0165167 | A1 | 9/2001 |

OTHER PUBLICATIONS

International Searching Authority, International Search Report for PCT/EP2012/066990 Mailed Apr. 16, 2013.

(Continued)

*Primary Examiner* — Sultan Chowdhury
(74) *Attorney, Agent, or Firm* — Lorenz & Kopf, LLP

(57) ABSTRACT

A supply channel for a means of transportation is provided. The supply channel comprises a fluid line, an inflatable projection element having an opening and a pressure sensor which is configured for determining a pressure difference between an internal pressure in the projection element and an ambient pressure. The inflatable projection element is connected to the fluid line via the opening. The projection element is configured for being transferred from a compressed state to an inflated state by filling it with fluid from the fluid line. The projection element provides a predetermined projection surface in the inflated state.

20 Claims, 4 Drawing Sheets

(51) Int. Cl.
*G09F 15/00* (2006.01)
*B64D 13/00* (2006.01)

(56) References Cited

U.S. PATENT DOCUMENTS

| | | | | |
|---|---|---|---|---|
| 5,123,728 | A | 6/1992 | Gradin et al. | |
| 6,304,173 | B2 | 10/2001 | Pala et al. | |
| 6,758,493 | B2 | 7/2004 | Conlee et al. | |
| 7,036,936 | B2 | 5/2006 | Hattori et al. | |
| 7,961,388 | B1 | 6/2011 | Deutsch et al. | |
| 8,246,173 | B2 * | 8/2012 | Vogel | H04N 5/7441 353/119 |
| 2003/0213518 | A1 | 11/2003 | Zielinski et al. | |
| 2005/0056202 | A1 * | 3/2005 | Bober | A47L 13/00 116/200 |
| 2007/0019162 | A1 * | 1/2007 | Gomez de Llarena | G03B 15/006 353/13 |
| 2009/0107020 | A1 * | 4/2009 | Aires | G09F 7/00 40/610 |
| 2009/0272015 | A1 * | 11/2009 | Schnuckle | A47G 19/2227 40/299.01 |
| 2010/0201950 | A1 | 8/2010 | Budinger et al. | |

OTHER PUBLICATIONS

International Searching Authority, Written Opinion for PCT/EP2012/066990 Mailed Apr. 16, 2013.

German Patent Office, Office Action for DE102011053197.1 Mailed Jun. 29, 2012.

Wikipedia, "Venturi effect", www.wikipedia.org/wiki/Ventury, published at least as early as Jan. 11, 2014, retrieved Jan. 20, 2014.

Tape Media Services, "aufblasbare airSYSTEC Airscreen Leinwand Verkauf—die Profi Airscreen Leinwand vom Entwickler und Erfinder," http://www.tape.de/html/screen.html, published at least as early as Aug. 3, 2009, retrieved Feb. 25, 2014.

* cited by examiner

INFLATABLE PROJECTION SURFACE FOR A TRANSPORTATION MEANS

CROSS-REFERENCE TO RELATED APPLICATIONS

This is a continuation of International Application No. PCT/EP2012/066990, filed Aug. 31, 2012, which application claims priority to German Patent Application No. 10 2011 053 197.1, filed Sep. 1, 2011 and to U.S. Provisional Application No. 61/530,063, filed Sep. 1, 2011, which are each incorporated herein by reference in their entirety.

TECHNICAL FIELD

The technical field relates to a supply channel comprising an inflatable projection element, an aircraft comprising a corresponding supply channel, and a corresponding method for retracting and extending the inflatable projection element.

BACKGROUND

For informing and entertaining passengers on a means of transportation, screens may be provided, for example above the passenger seats. The screens can be retractable so as to meet particular safety regulations and to make it more comfortable for passengers to embark and disembark.

The screens may for example be in the form of TFT screens and for example be retracted and extended electrically by servo motors. Furthermore, pico projection systems, in which a so-called pico projector and a corresponding canvas screen can replace a screen, are known for example from DE 10 2009 008 543 A1 and US 2010 201 950 A1. Just like the screens, the canvas screen can also be actuated by a flap mechanism or can be designed rollable. However, the rollable canvas screen may require a very complex, delicate and sensitive drive.

In the above-mentioned systems, the width of the screen or the canvas screen is limited to the width of the installation duct. Further, a motor which is required for folding and unfolding, or a folding and unfolding mechanism, takes up valuable construction space.

In addition, other objects, desirable features and characteristics will become apparent from the subsequent summary and detailed description, and the appended claims, taken in conjunction with the accompanying drawings and this background.

SUMMARY

According to various embodiments, provided is a supply channel having an image display option which on the one hand is compact and which on the other hand makes it possible to display images exceeding the dimensions of the supply channel.

According to one of various aspects of the present disclosure, a supply channel for a means of transportation is provided. The supply channel comprises a fluid line and an inflatable projection element having an opening. The inflatable projection element is connected to the fluid line via an opening. The inflatable projection element is configured for being transferred from a compressed state to an inflated state by filling it with fluid from the fluid line. The inflatable projection element is further configured for providing a predetermined projection surface in the inflated state.

In other words, the present disclosure is based on the idea of providing an inflatable projection surface for a means of transportation, which for example takes on its shape and position, purely on the basis of the cut pattern of the projection element, as soon as a fluid such as air is pumped or blown in.

Therein, the supply channel according to the present disclosure comprising the inflatable projection element makes it possible to provide an effective projection surface which may be substantially wider than the supply channel itself. In a compressed state, the projection element may be stored in a recess in the supply channel. In one example, a motor for folding and unfolding is unnecessary, so that weight and space may be saved. Further, no transmission elements arranged outside the supply channel are necessary, so that the system is very robust and has a much lower risk of injury than known devices, for example in the event of a collision for example with the head of a passenger. In addition, greater flexibility may be provided as regards the seating of the means of transportation, since both the projection surface and the extension mechanism take up less space than known devices. In addition, the channel according to the present disclosure comprising the inflatable projection element is simpler and cheaper to manufacture.

The supply channel, also known as a passenger supply channel (PSC), may be installed above the heads of the passengers in a means of transportation such as an aircraft, a bus or a car. Additional units such as a lighting unit, a ventilation unit and signal units having different signs such as a “fasten seatbelt” or “no smoking” sign may be provided in the supply channel. Oxygen masks and connections to oxygen lines, for example, may further be provided in the supply channel. The supply channel may also comprise several projection elements.

A fluid line, in one example, an air line, is provided in the supply channel. The fluid for inflating the projection element is generally air. Alternatively, any desired gas or if appropriate even a liquid may be used. The fluid line may for example be connected to the air conditioning system of the means of transportation. Therein, the fluid, in particular the air for pumping up the projection element, may for example be fresh air from the vicinity of the means of transportation or else consumed air from the interior of the means of transportation.

The inflatable projection element may for example be an air envelope, for example similar to an air mattress, which may be inflated and compressed again. The shape of the projection element in the inflated state may be determined by a cut pattern of the projection element. In the inflated state, the projection element provides a predetermined projection surface. Therein, the projection surface may for example be planar or alternatively have a slight curvature. In a curved projection surface, distortion may be eliminated and an agreeable image for the passenger may be projected onto the projection surface. For example, a central processing unit and a micro projector may be used for this purpose. In the inflated state, the projection element may for example be designed as a hollow chamber, similar to an airbag, which on one side has a planar surface which acts as a projection surface. Alternatively, the projection element may have an inflatable frame which spans a membrane as a projection surface.

The inflatable projection element has an opening, which may for example be configured so as to be sealable or permanently open. The inflatable projection element is connected to the fluid line via the opening. For example, the fluid line may project into the inflatable projection element through the opening. Further, the inflatable projection element may be connected to the fluid line via the opening in a fluid-tight manner. A seal may be provided between the opening and the fluid line for this purpose. By creating an overpressure in the fluid line, the projection element may be transferred from the compressed state to the inflated state. Further, by creating a negative pressure in the fluid line, the inflatable projection element may be transferred from the inflated state to the compressed state.

The opening may be designed as permanently open, in such a way that the inflatable projection element may be supplied with a fluid continuously, and the pressure in the interior of the projection element in the inflated state may thus be maintained. Alternatively, the opening may be made sealable by a closing element.

The inflatable projection element is configured so as to enter the compressed state when for example the pressure of the ambiance is greater than the pressure in the interior of the projection element by a particular amount. The volume of the projection element may be several times lower in the compressed state than in the inflated state. The projection element may be stored in the supply channel in the compressed state, in such a way that it does not take up much space and is not visible from the passenger compartment of the means of transportation. By contrast, in the inflated state, the projection element may have large dimensions and for example exceed the dimensions of the supply channel.

A projection system, comprising the inflatable projection element and a projector, for example a pico projector, may also be integrated into the supply channel. Therein, the projector and the projection surface of the inflatable projection element form a graphic display unit, which is modular, that is to say integrated into the supply channel separately.

According to one embodiment of the present disclosure, the inflatable projection element comprises a foldable, non-resilient and/or fluid-tight material. In one example, the projection element may comprise a foldable, non-resilient and fluid-tight material. Therein, the material may be selected so as to be suitable as a projection surface. In one example, the material may be matt or non-reflective. Alternatively, the material may be transparent in part and thus make a rear projection possible. Therein, a corresponding projector, for example, a pico projector, could be arranged behind the canvas screen instead of in front of it. In a configuration of this type, the projector could be integrated inside the projection element.

Furthermore, the material may be selected in such a way that it meets particular safety requirements. For example, the material may be selected in such a way that it meets particular flight safety regulations, and does not release particular vapours in case of a fire. The material of the inflatable projection element may be foldable in such a way that it takes up as small a volume as possible in the compressed state. Further, the material may be a non-resilient, that is to say non-stretchable material, in such a way that the shape and if appropriate the position of the projection element and in particular of the projection surface in the inflated state are determined purely by the cut pattern of the projection element. Further, the material is fluid-tight, in particular air-tight or minimally permeable to air.

According to one embodiment of the present disclosure, a recess is provided in the supply channel. In the compressed state, the inflatable projection element is arranged in the recess. The supply channel further comprises a flap element, which covers the recess and thus the projection element when in a closed position. Therein, the flap element is configured so as to be pushed or slid into an open position by the projection element when the projection element is transferred from the compressed state into the inflated state.

The recess may for example be designed as an opening or a hollow chamber in the supply channel, which is configured for accommodating the compressed projection element. The flap element may for example be a flap which is formed as an integral component of the supply channel. The flap element may for example be visually matched to the supply channel or the cladding of the supply channel in such a way that it is aesthetically harmonised with the environment. When in the closed position, the flap element may end flush with the supply channel or the cladding of the supply channel and thus cover the recess. Therein, the inflatable projection element may be connected to the flap element. For example, a surface of the projection element may be glued to the flap element.

Therein, the inflatable projection element is connected to the flap element in such a way that, when the projection element is filled with fluid, the flap element is slid or pushed into the open position when a particular pressure is exceeded in the interior of the projection element. When the projection element is in the compressed state, the flap element is typically in the closed position and thus covers the recess.

According to one embodiment of the present disclosure, the flap element is connected to the supply channel by a hinge element or articulated joint element. Therein, a locking device is provided on the hinge element and is configured for locking the flap element in the open position.

The hinge element, together with the locking device, may for example delimit a maximum opening angle of the flap element or define the open position of the flap element. For example, the locking device may comprise a non-round camshaft, which at a particular angle of rotation frictionally engages and locks into place with a sleeve. Alternatively, toothings may be provided on the hinge element, which at a particular rotational angle of the hinge element engage with a toothing of the locking device.

The locking device may for example be releasable electrically or manually. Alternatively, the locking device may for example be released from a frictional locking by exerting an opposing force, for example by way of a negative pressure in the interior of the projection element.

If fluid is then pumped into the inflatable projection element, the projection element pushes the flap open, until the flap reaches its fully open position. Therein, the open position is defined by a particular angle relative to a longitudinal axis of the supply channel or the cladding of the supply channel. Once the clap has reached the open position, the hinge element is engaged by the locking device, whilst the projection element continues to unfold to its full size. Therein, the projection element may fold outwards past the edge regions of the flap element and beyond the dimensions of the supply channel. By providing a defined maximum opening of the flap element by the locking device, it may be provided that the projection element is held open by the flap element, for example even if the pressure inside the projection element falls. In this way, even if the pressure inside the projection element falls, an image may still be projected onto the projection surface of the projection element, as long as a particular negative pressure has not yet been reached in the projection element.

According to one embodiment of the present disclosure, the supply channel comprises a spring element, which is fixed to the flap element. Therein, the spring element is fixed to the supply channel in such a way that it is biased when the projection element is transferred from the compressed state to the inflated state. The spring element is further configured for transferring the flap element into the closed position after the locking device is released.

For example, the spring element may serve to facilitate the release of the locking device and to compensate the gravity acting on the flap element. The spring element may be designed as a torsion spring and be arranged at or in the hinge element. By inflating the projection element, the flap element is thus opened and as a result the spring element is biased. If the pressure in the projection element falls, the spring force may support the retraction of the spring element.

According to one embodiment of the present disclosure, the supply channel comprises a valve which is arranged on the fluid line. In a first state, the valve makes it possible to fill the projection element with fluid. In a second state, the valve makes it possible to suck fluid out of the projection element.

The valve may for example be an automatic mechanical valve or an electrically controllable valve. In one example, according to one embodiment of the present disclosure, the valve may be designed as a venturi nozzle or venturi valve. The valve may comprise a first pipe portion which has a constriction, that is to say for example a constricted cross-section, at one point. At the constriction, a second pipe portion branches off, which may be connected to the opening of the projection element or may project into said opening. Downstream from the branch of the second pipe portion, a closing element may be provided, which may be actuated for example mechanically or electrically. The closing element may be designed as a flap or a spring-loaded ball valve.

Fluid may arrive in the interior of the projection element, in such a way that the projection element is inflated, from the first pipe portion, for example when the closing element is closed, via the second pipe portion, which is connected to the opening of the projection element. This corresponds to the first state of the valve.

If the closing element of the valve is open for example, the valve may act as a so-called suction jet pump. If fluid is passed into the first pipe portion, it flows through the constriction in the pipe. Therein, the speed of the fluid typically increases, as a result of the decrease in the cross-section of the pipe. As a result, the pressure decreases in the second pipe portion, which is attached to the first pipe portion at the constriction. As a result of the resulting negative pressure, fluid is sucked from the second pipe portion into the first pipe portion and pulled along. As a result, fluid is sucked out of the projection element through the second pipe portion, which communicates with the opening of the projection element. In this way, in the second state of the valve in which the closing element of the valve is open, fluid is sucked out of the projection element, in such a way that said element is transferred into the compressed state.

The valve may also be configured for regulating the pressure inside the projection element automatically, and if applicable to prevent an overpressure which might lead to the projection element bursting. Furthermore, the valve may be configured in such a way that it is mechanically placed into the second state if the power fails, so as to bring about a secured retraction of the projection element and the flap element.

According to one embodiment of the present disclosure, the supply channel further comprises a pressure sensor, which is configured so as to determine a pressure difference between a current internal pressure, that is to say a pressure in the interior of the projection element, and an ambient pressure. The supply channel further comprises a regulation unit, which is configured so as to regulate the internal pressure in the projection element as a function of the determined pressure difference. According to one embodiment of the present disclosure, the regulation unit regulates the internal pressure in the projection element by actuating the valve. Therein, the regulation unit may for example regulate the position of the closing element. Alternatively, the regulation unit may regulate the internal pressure in the projection element by actuating a compressor which is attached to the opening of the projection element.

Therein, the pressure sensor may for example be configured as a differential pressure sensor, and comprise a first measuring chamber and a second measuring chamber, which for example are hermetically separated from one another by a membrane. Therein, the first measuring chamber may be in contact with the environment, that is to say for example the cabin of the means of transportation. The second measuring chamber may be connected to the interior of the projection element. The resulting deflection of the membrane between the measuring chambers is a measure of the value of the pressure difference.

The regulation unit is connected to the pressure sensor, so as to receive the pressure difference measurement values. Furthermore, the regulation unit is connected to the valve, in particular to the closing element of the valve, so as to regulate, as a function of the detected pressure difference, the volume of the fluid which is pumped in or sucked out of the projection element. If the projection element is to be transferred into the inflated state, the regulation unit may transfer the closing element of the valve in the first state until the pressure in the interior of the projection element exceeds the ambient pressure by a predetermined pressure value. If the projection element is already in the inflated state, the regulation unit may determine the pressure difference between the environment of the projection element and the interior of the projection element, continuously or at particular time intervals, and if necessary adjust the closing element of the valve, possibly only slightly, so as to keep the internal pressure of the projection element at a value which may be predetermined.

If the projection element is to be retracted, that is to say transferred from the inflated state to the compressed state, the regulation unit may place the valve or the closing element of the valve in the second state, in such a way that the fluid is sucked through the second pipe portion of the valve via the opening of the projection element until the projection element is stored compressed in a recess of the supply channel. Therein, the projection element initially folds at least in part into the recess of the supply channel. Subsequently, when the negative pressure at the opening of the projection element is strong enough, that is to say exceeds a particular value, the locking device on the hinge element of the flap element may be released, in such a way that the flap element moves into the closed position.

According to one embodiment, a compressor which is configured so as to compress the fluid is provided on the fluid line upstream from the opening of the projection element.

The compressor may be configured as a bellows, which for example compresses the ambient air and may supply the projection element. Alternatively, the compressor may compress air from an air conditioning system of the means of transportation and supply it to the projection element.

According to one embodiment of the present disclosure, the fluid line is configured as an air line which is connected to an air conditioning system of the means of transportation. In particular in aircraft, it may be advantageous to use the air lines which are already present in the supply channel for pumping the projection element up and down.

According to one of various aspects of the present disclosure, an aircraft is provided which comprises an air conditioning system having an air line and a supply channel as disclosed herein above. The aircraft may also comprise several supply channels as described herein above.

According to one of various aspects of the present disclosure, a method for extending the inflatable projection element of a supply channel is provided. The method comprises the following: determining a pressure difference between an internal pressure in the projection element and an ambient pressure by a pressure sensor; transferring the inflatable projection element into an inflated state by introducing fluid into the projection element through an opening until the internal pressure of the projection element exceeds the environmental pressure by a predeterminable amount.

According to one of various aspects of the present disclosure, a method for retracting the inflatable projection element of a supply channel is provided. The method comprises the following: transferring the inflatable projection element into a compressed state by generating a negative pressure at an opening of the projection element; and closing the flap element by generating further negative pressure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
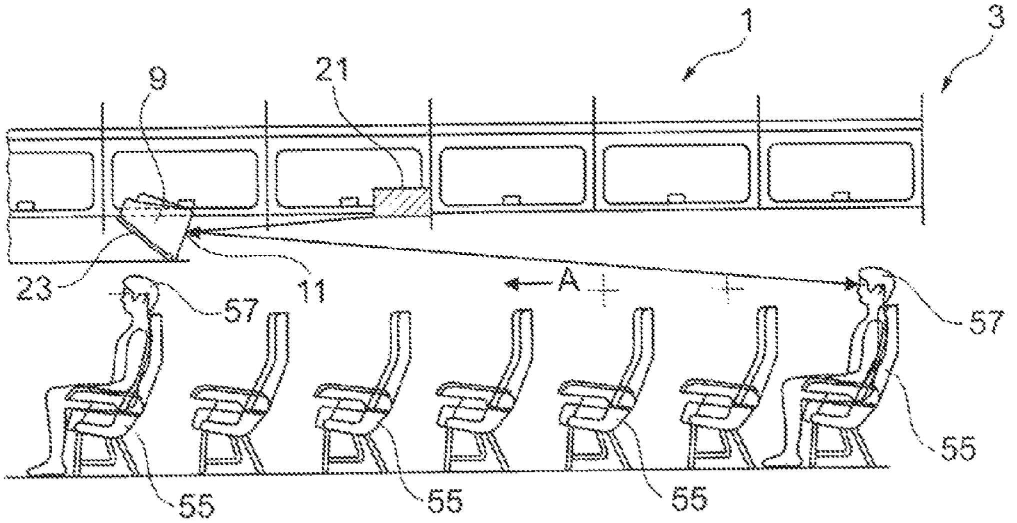
FIG. 1 shows an arrangement of a supply channel having a graphic display unit in a means of transportation.

FIG. 1 shows an arrangement of a supply channel 1, comprising a graphic display unit comprising an inflatable projection element 9 and a projector 21, in a means of transportation 3. In an aircraft, the display unit may be referred to as an overhead in-flight entertainment system (IFE system), for example. The supply channel 1 is arranged above the heads of the passengers 57 and thus above the passenger seats 55. The inflatable projection element 9 is designed separately from the projector 21 and arranged at a particular distance therefrom. In the inflated state of the projection element 9, a projection surface 11 is orientated in such a way that it is clearly visible to the passengers 57, who are looking in the direction of flight or travel A. The projector 21 may for example be designed as a so-called pico projector, and may for example take the inclination and curvature of the projection surface 11 into account in the projection onto the projection surface 11, for example by a central processing unit. Therein, the means of transportation 3 may be designed as a bus or an aircraft, for example.

Figure 8:
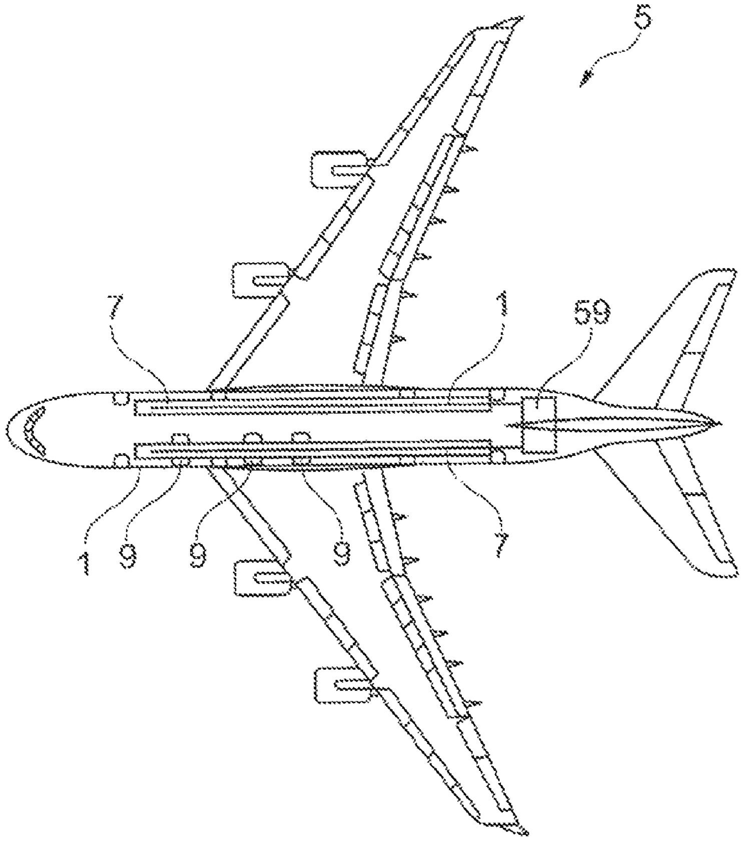
FIG. 8 shows an aircraft having a supply channel according to one embodiment of the present disclosure.

FIG. 8 shows the means of transportation 3 designed as an aircraft 5. FIG. 8 is a plan view of the aircraft 5, in which two supply channels 1 may be seen. A fluid line 7 extends in each supply channel, and is connected to an air conditioning system 59 of the aircraft. The air conditioning system 59 provides the inflatable projection elements 9 with air via the fluid lines 7.

Figure 2:
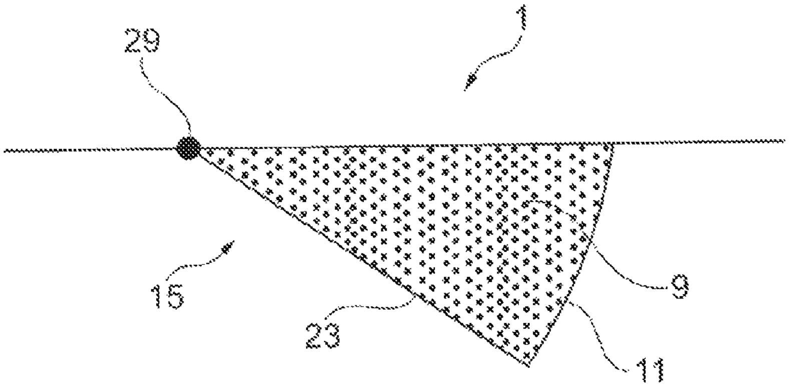
FIG. 2 shows a cross-section through an inflatable projection element.

In FIG. 2 a cross-section through an inflatable projection element 9 is shown. Only the part of the means of transportation 3 which extends into the passenger cabin is shown. FIG. 2 shows the inflatable projection element 9 in the inflated state 15. Therein, the inflatable projection element 9 comprises a foldable, non-resilient and fluid-tight material. For example, the projection element 9 may be designed similar to an airbag. On the underside or on the lower edge of the projection element 9, a flap element 23 may be provided, to which the projection element 9 is fixed for example by gluing. The flap element 23 may be an integral component of the supply channel 1. For example, the flap element 23 may be rotatably connected to the supply channel 1 via a hinge element 29.

Figure 3:
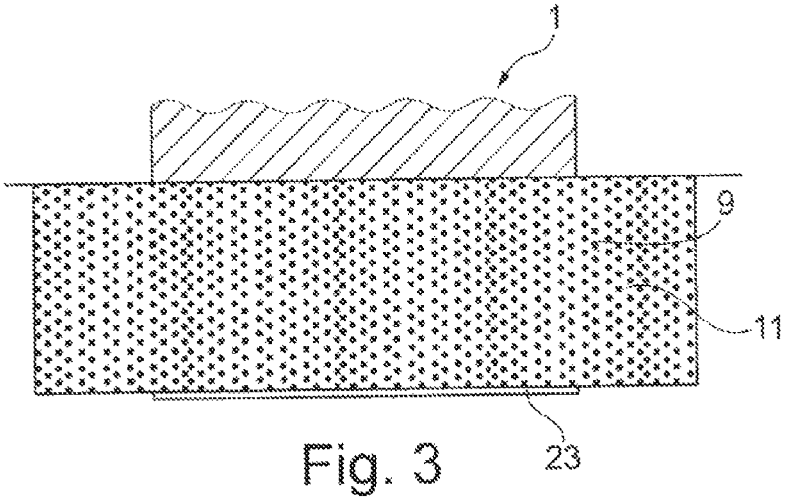
FIG. 3 shows a plan view of a projection surface of a projection element.

FIG. 3 shows a plan view of the projection element 9 or the projection surface 11 in the inflated state 15. This makes it clear that the inflatable projection element 9 may advantageously extend beyond the dimensions of the supply channel 1 and the flap element 23. In one example, the projection surface 11 is wider than the supply channel 1 and the flap element 23.

Figure 4:
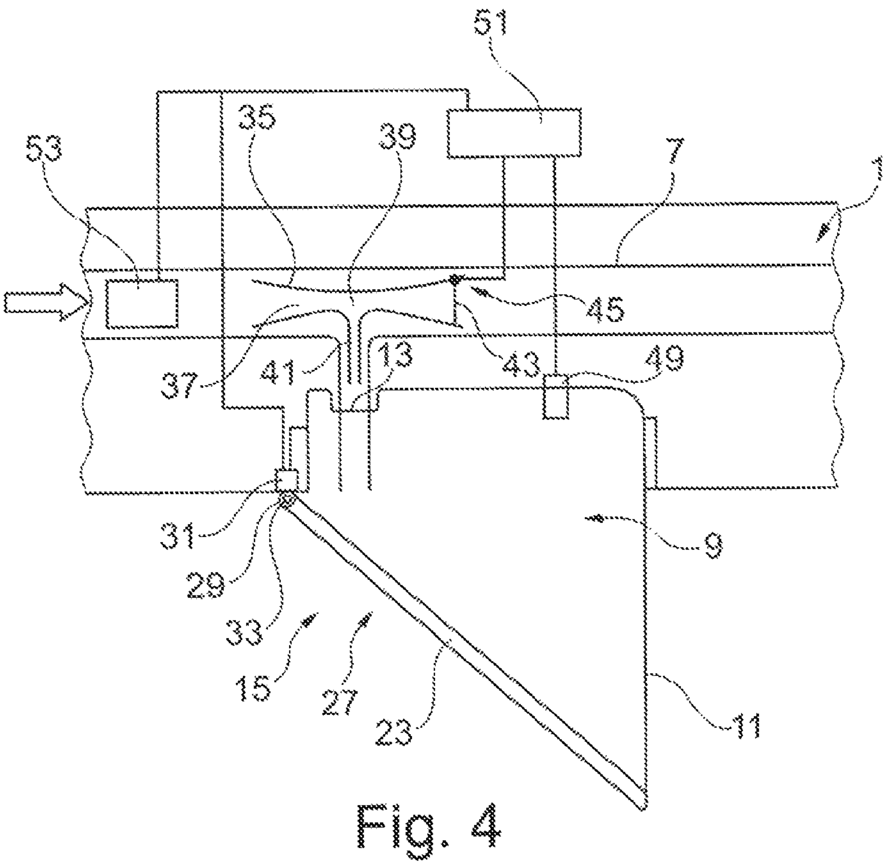
FIG. 4 shows a supply channel having an inflatable projection element in the inflated state.
Figure 5:
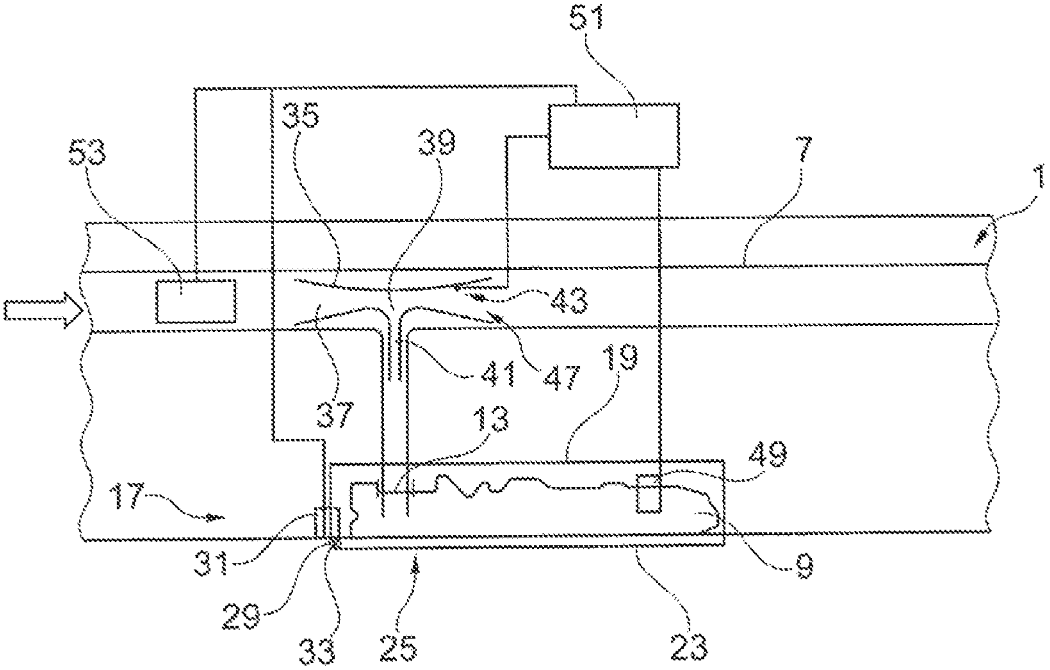
FIG. 5 shows a supply channel having an inflatable projection element in the compressed state.

FIGS. 4 and 5 show the construction of the supply channel 1 and the inflatable projection element 9 in greater detail. The projection element 9 is shown in the inflated state 15 in FIG. 4 and in the compressed state 17 in FIG. 5. The supply channel 1 comprises a fluid line 7, which is for example designed as an air line and may be connected to an air conditioning system 59. The inflatable projection element 9 is connected to the fluid line 7 via an opening 13. The projection element 9 may be filled with fluid via the fluid line 7, and thus be transferred from the compressed state 17 to the inflated state 15. By sucking up fluid, the process may be reversed. Therein, in the inflated state the projection element 9 provides the projection surface 11, which projects into the passenger cabin (FIG. 3). In the compressed state 17, the inflatable projection element 9 takes up very little space and is arranged in a recess 19 in the supply channel 1, as shown in FIG. 5.

The flap element 23 has an open position 27 (FIG. 4) and a closed position 25 (FIG. 5). In the closed position 25, the flap element 23 covers the recess 19 in which the inflatable projection element 9 is located in the compressed state 17, generally so as to be flush.

If the projection element 9 is located in the supply channel 1 in the compressed state 17, fluid may be introduced into the projection element 9, in such a way that the flap element 23 is pressed downwards into the cabin space. A locking device 31 is generally provided on the hinge 29 of the flap element 23, and engages as soon as the flap element 23 has reached a provided end position, that is to say the open position. Subsequently, the projection element 9 unfolds to the full size thereof, beyond the dimensions of the supply channel 1 and the flap element 23. This is shown for example in the plan view in FIG. 3.

For transferring the inflatable projection element 9 into the compressed state 17, a negative pressure is generated at the opening 13 of the projection element 9 relative to the cabin of the means of transportation 3. Since the flap element 23 is held in the open position 27 by the locking device 31, the protruding part of the projection element 9 or the projection surface 11 is initially sucked in. The locking device 31 is released, if appropriate automatically, and the flap element 23 moves into the closed position 25, only when all of the protruding parts of the projection element 9 have been retracted or sucked into the recess 19 of the supply channel 1 and the pressure or negative pressure which acts on the flap element 23 increases. In the closed position 25, the flap element 23 may also be locked by a latching mechanism, which is not shown in the drawings. The release of the locking device 31 may for example be promoted by a spring element 33, which is biased when the flap element 23 is opened. Therein, the spring element 33 is for example designed as a torsion spring on the hinge element 29. Further, the locking device 31 may also be actuated electrically by a regulation unit 51.

For compressing the fluid, a compressor 53 may be arranged on the fluid line 7 upstream from the opening 13 of the projection element 9. The compressor 53 may support the generation of a required overpressure or negative pressure on the projection element 9. The arrows in FIGS. 4 and 5 respectively show the flow direction of the fluid in the fluid line 7.

The inflation and compression of the projection element 9 may be controlled by a valve 35. The valve 35 may for example be designed as a venturi nozzle or a suction jet pump and comprise a first pipe portion 37, which is arranged parallel to the fluid line 7. A constriction of the pipe cross-section 39, at which a second pipe portion 41 is attached, is provided on the first pipe portion 37. Therein, the second pipe portion 41 may extend into the opening 13 of the projection element 9. A closing element 43 is provided downstream from the constriction 39 of the pipe cross-section. If the closing element 43 or the valve 35 is in a first state 45, as shown in FIG. 4, the fluid, for example the air, is passed from the fluid line 7 into the projection element 9, in such a way that said element is inflated. If the closing element 43 or the valve 35 is in a second state 47, which is shown in FIG. 5, a negative pressure is produced at the constriction 39 by the fluid which flows past, in such a way that fluid is sucked off from the projection element 9 and said element is transferred into the compressed state.

Figure 6:
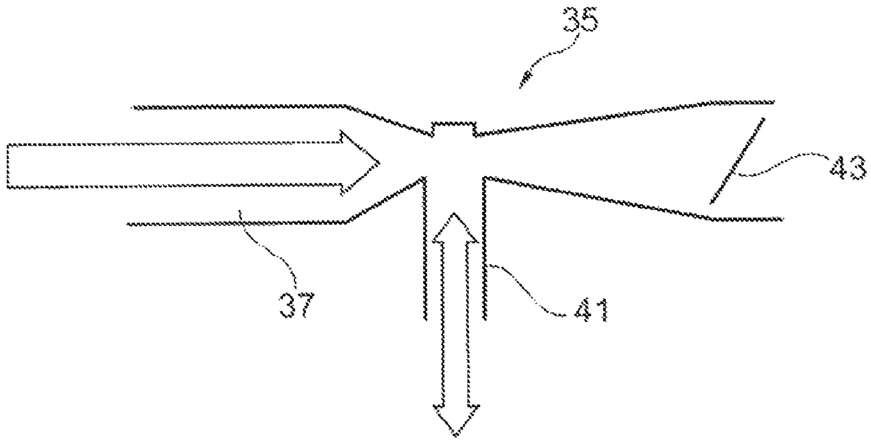
FIG. 6 shows an enlarged drawing of a valve which is arranged on a fluid line.

FIG. 6 an enlarged drawing of the valve 35 is shown. In FIG. 6, the valve 35 or the closing element 43 is shown in a position between the first state 45 and the second state 47. FIG. 4 shows the first state 45 of the valve 35, and FIG. 5 shows the second state 47. An intermediate position of the closing element 43, as shown in FIG. 6, may be used for example to readjust the pressure inside the projection element 9. If the closing element 43 of the valve element 35 is closed, that is to say the valve 35 or the closing element 43 is in the first state, this results in a back pressure which is passed to the projection element 9 via the second pipe portion 41. This is shown by the arrows. If the closing element 43 is in an open position, that is to say in the second state 47, the air or fluid flowing in the first pipe portion 37 creates a negative pressure at the second pipe portion 41.

The valve 35 may further be used to regulate the pressure inside the projection element 9 and thus if appropriate to prevent an overpressure which might lead to the projection element 9 bursting. If the power fails, the valve 35 may be placed in the second state 47 mechanically, and this leads to secured retraction of the inflatable projection element 9.

As is shown in FIGS. 4 and 5, a pressure sensor 49, in one example, in the form of a differential pressure sensor, may be arranged on the projection element 9. Therein, the pressure sensor 49 is configured so as to determine a pressure difference between an internal pressure in the projection element 9 and an ambient pressure of the projection element 9, for example in the passenger compartment. The detected pressure difference values may be transmitted to the regulation unit 51. The regulation unit 51 may be formed so as to regulate the internal pressure in the projection element 9 on the basis of the pressure difference value. For example, in the inflated state 15 of the projection element 9, the internal pressure may be kept at a constant value by pumping further fluid. Further, the regulation unit 51 may be connected to the closing element 43 so as to place the valve 35 into the first state 45 or into the second state 47 as required. Furthermore, the regulation unit 51 may be connected to the compressor 53, so as to regulate it as a function of the pressure difference which is detected by the pressure sensor 49. Furthermore, the regulation unit 51 may be connected to the locking device 31 so as to release it as required.

Figure 7A:
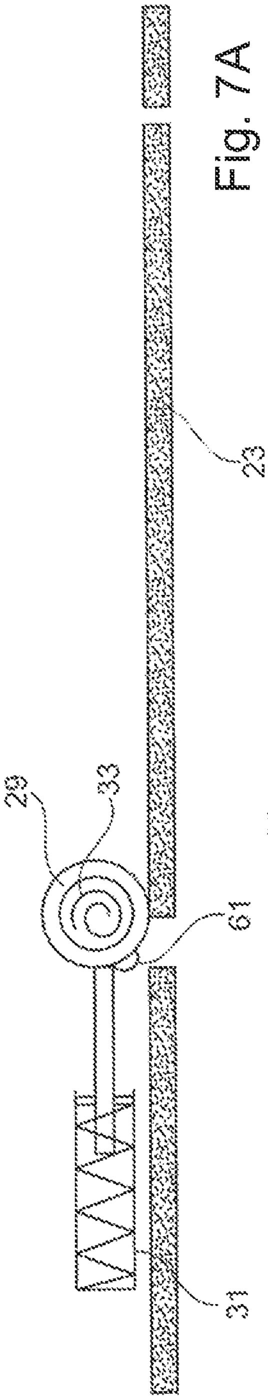
FIG. 7A shows an enlarged embodiment of a locking device in a first position.
Figure 7B:
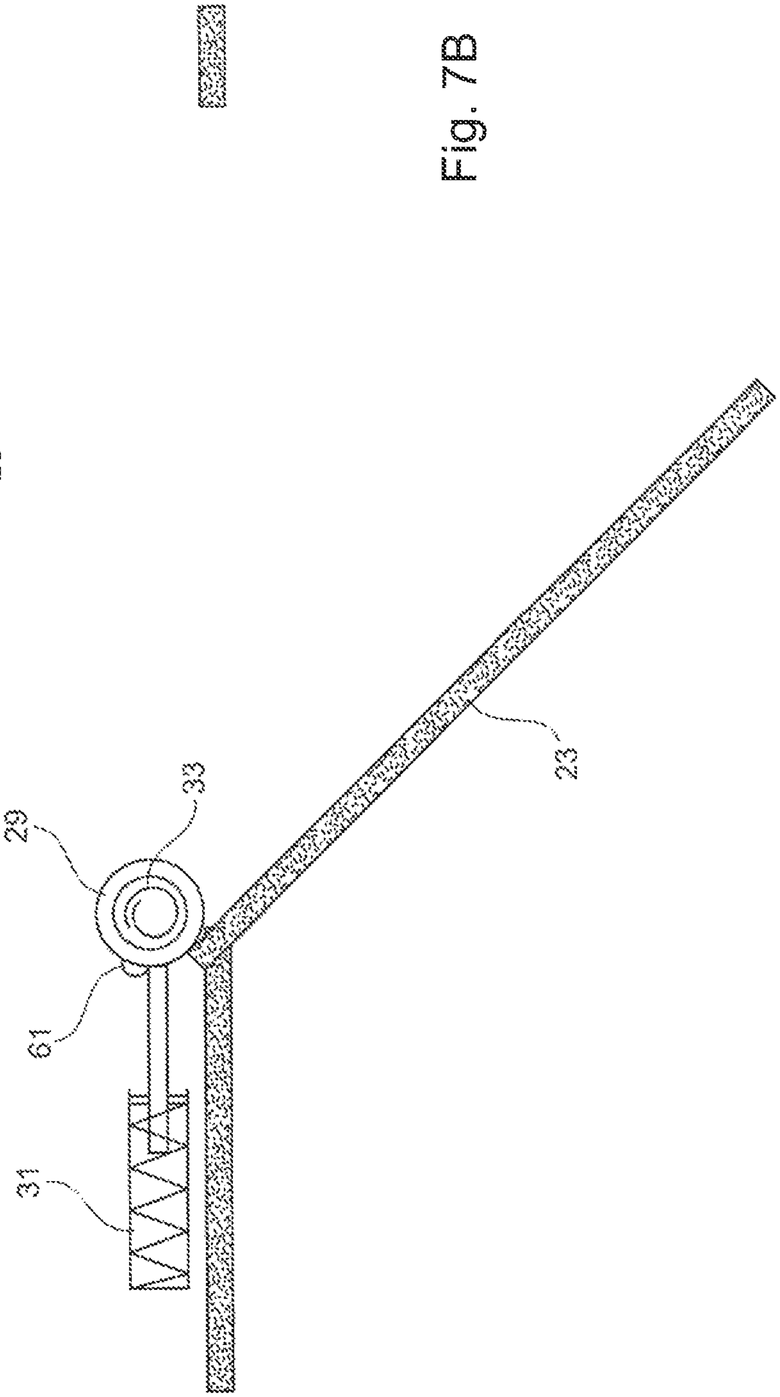
FIG. 7B shows an enlarged embodiment of the locking device in a second position.

FIGS. 7A and 7B show an embodiment of the locking device 31, enlarged. FIG. 7A shows the locking device 31 with the flap element 23 closed, and FIG. 7B shows it with the flap element 23 open. Therein, the locking device 31 comprises a rounded protrusion 61 or cam. A spring-loaded rod 63 presses against the hinge element 29, in such a way that a rotation of the hinge element 29 is initially prevented both in the position in FIG. 7A and in the position in 7B. The spring of the locking device 31 yields, and the hinge element 29 may be moved between the open and closed position of the flap element 27, 25, only when a force which results from an overpressure or negative pressure in the interior of the projection element 9 and acts on the flap element 23 is sufficiently large.

As a result of the configuration according to the present disclosure of the supply channel 1 comprising the inflatable projection element 9, it is possible to store a large projection surface 11 in a small constructional space, specifically in the recess 19 of the supply channel 1. Further, despite its compactness, in the inflated state 15 the projection surface 11 may extend beyond the dimensions of the supply channel 1, as shown for example in FIG. 3. Further, when the supply channel 1 according to the present disclosure comprising the inflatable element 9 is manufactured, the manufacturing costs and the weight may be reduced by comparison with conventional supply channels comprising screens. Furthermore, the extended projection surface 11 of the supply channel 1 comprising the inflatable projection element 9 is safer with regard to being touched. That is to say, if a passenger 57 accidentally bumps his head on the projection element 9, for example when leaving his passenger seat 55, he will not injure himself, since the construction is light and flexible.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A supply channel for a means of transportation, the supply channel comprising:

a fluid line, and an inflatable projection element having an opening, the inflatable projection element connected to the fluid line via the opening and the inflatable projection element configured for being transferred from a compressed state to an inflated state by filling it with fluid from the fluid line;

wherein the inflatable projection element is configured for providing a predetermined projection surface in the inflated state.

2. The supply channel according to claim 1, wherein the inflatable projection element comprises a foldable, non-resilient and fluid-tight material.

3. The supply channel according to claim 1, wherein a recess is provided in the supply channel; and the inflatable projection element is arranged in the recess wherein the flap element is configured for being pressed into an open position by the projection element when the projection element is transferred from the compressed state into the inflated state .

4. The supply channel according to claim 3, wherein the supply channel further comprises a flap element, which covers the recess when in a closed position, and the flap element is configured for being pressed into an open position by the inflatable projection element when the inflatable projection element is transferred from the compressed state into the inflated state.

5. The supply channel according to claim 4, wherein the flap element is connected to the supply channel by a hinge element; and wherein a locking device is provided at the hinge element and is configured so as to lock the flap element in the open position.

6. The supply channel according to claim 5, further comprising:

a spring element, which is attached to the flap element;

wherein the spring element is arranged at the supply channel in such a way that it is biased when the inflatable projection element is transferred from the compressed state to the inflated state;

wherein the spring element is configured for transferring the flap element into the closed position once the locking device is released.

7. The supply channel according to claim 1, further comprising:

a valve which is arranged at the fluid line;

wherein in a first state, the valve allows for filling the inflatable projection element with fluid;

wherein in a second state, the valve allows for sucking fluid out of the inflatable projection element.

8. The supply channel according to claim 7, wherein the valve is a venturi nozzle.

9. The supply channel according to claim 7, further comprising:

a pressure sensor, which is configured for determining a pressure difference between an internal pressure in the inflatable projection element and an ambient pressure; and a regulation unit , which is configured for regulating an internal pressure in the inflatable projection element as a function of the determined pressure difference.

10. The supply channel according to claim 9, wherein the regulation unit regulates the internal pressure in the inflatable projection element by actuating the valve.

11. The supply channel according to claim 1, wherein a compressor is provided on the fluid line upstream from the opening of the inflatable projection element, and is configured for compressing the fluid.

12. The supply channel according to claim 1, wherein the fluid line is designed as an air line and is connected to an air conditioning system.

13. An aircraft, comprising:

an air conditioning system having an air line;

a supply channel including an inflatable projection element having an opening, the inflatable projection element connected to the air line via the opening, the inflatable projection element configured for being transferred from a compressed state to an inflated state by filling it with fluid from the air line, and the inflatable projection element provides a predetermined projection surface in the inflated state wherein the inflatable projection element is connected to the fluid line formed as an air line via the opening.

14. The aircraft according to claim 13, wherein a recess is provided in the supply channel, and in the compressed state, the inflatable projection element is arranged in the recess.

15. The aircraft according to claim 14, wherein the supply channel further comprises a flap element, which covers the recess when in a closed position, and the flap element is configured for being pressed into an open position by the inflatable projection element when the inflatable projection element is transferred from the compressed state into the inflated state.

16. The aircraft according to claim 15, wherein the flap element is connected to the supply channel by a hinge element, and a locking device is provided at the hinge element and is configured so as to lock the flap element in the open position.

17. The aircraft according to claim 16, further comprising:

a spring element, which is attached to the flap element;

wherein the spring element is arranged at the supply channel in such a way that it is biased when the inflatable projection element is transferred from the compressed state to the inflated state;

wherein the spring element is configured for transferring the flap element into the closed position once the locking device is released.

18. The aircraft according to claim 13, further comprising:

a valve which is arranged at the fluid line;

wherein in a first state, the valve allows for filling the inflatable projection element with fluid and in a second state, the valve allows for sucking fluid out of the inflatable projection element.

19. A method for extending an inflatable projection element of a supply channel , the method comprising the steps of:

determining a pressure difference between an internal pressure in the inflatable projection element and an ambient pressure by a pressure sensor ; and transferring the inflatable projection element into an inflated state by introducing fluid into the inflatable projection element through an opening of the inflatable projection element until the internal pressure of the inflatable projection element exceeds the ambient pressure by a predetermined amount.

20. A method for retracting an inflatable projection element of a supply channel, the method comprising the steps of:

transferring the inflatable projection element into a compressed state by generating a negative pressure at an opening of the projection element, the inflatable projection element received in a recess in the compressed state; and closing a flap element that covers the recess by generating further negative pressure.

* * * * *